United States Patent [19]

Laseter

[11] 4,234,272
[45] * Nov. 18, 1980

[54] MATERIAL CONVEYOR

[76] Inventor: Douglas E. Laseter, 312 Sterling Towers, Jackson, Miss. 39202

[*] Notice: The portion of the term of this patent subsequent to Dec. 18, 1996, has been disclaimed.

[21] Appl. No.: 949,137

[22] Filed: Oct. 6, 1978

Related U.S. Application Data

[63] Continuation-in-part of Ser. No. 897,338, Apr. 18, 1976, Pat. No. 4,179,232.

[51] Int. Cl.³ ............................................... B65G 53/46
[52] U.S. Cl. .......................................... 406/64; 406/67
[58] Field of Search ....................... 406/63, 64, 65, 66, 406/67, 68; 222/636

[56]  References Cited
U.S. PATENT DOCUMENTS

| 2,314,031 | 3/1943 | Colburn | 406/63 |
| 2,740,672 | 4/1956 | Morrow | 406/63 |
| 2,779,634 | 1/1957 | Atkinson et al. | 406/67 |
| 3,492,050 | 1/1970 | Colinet | 406/63 |

FOREIGN PATENT DOCUMENTS

| 1255036 | 11/1967 | Fed. Rep. of Germany | 406/65 |
| 31679 | 9/1964 | German Democratic Rep. | 406/67 |
| 583933 | 10/1958 | Italy | 406/67 |

Primary Examiner—James L. Rowland
Attorney, Agent, or Firm—Shoemaker and Mattare, Ltd.

[57] ABSTRACT

A device for conveying measured amounts of material which includes a rotating induction wheel having a plurality of elongate open-ended chambers defined therein and a pair of wipers arranged to remove excess material from the chamber ends. Pressure pads seal the chambers, and gas is introduced into the chambers to pulse the material out of the chambers into a material transport conduit. Metered charges of material are thus delivered to the transport conduit. An alternative embodiment of the metering device has a pair of sequential chambers pressurized simultaneously.

9 Claims, 6 Drawing Figures

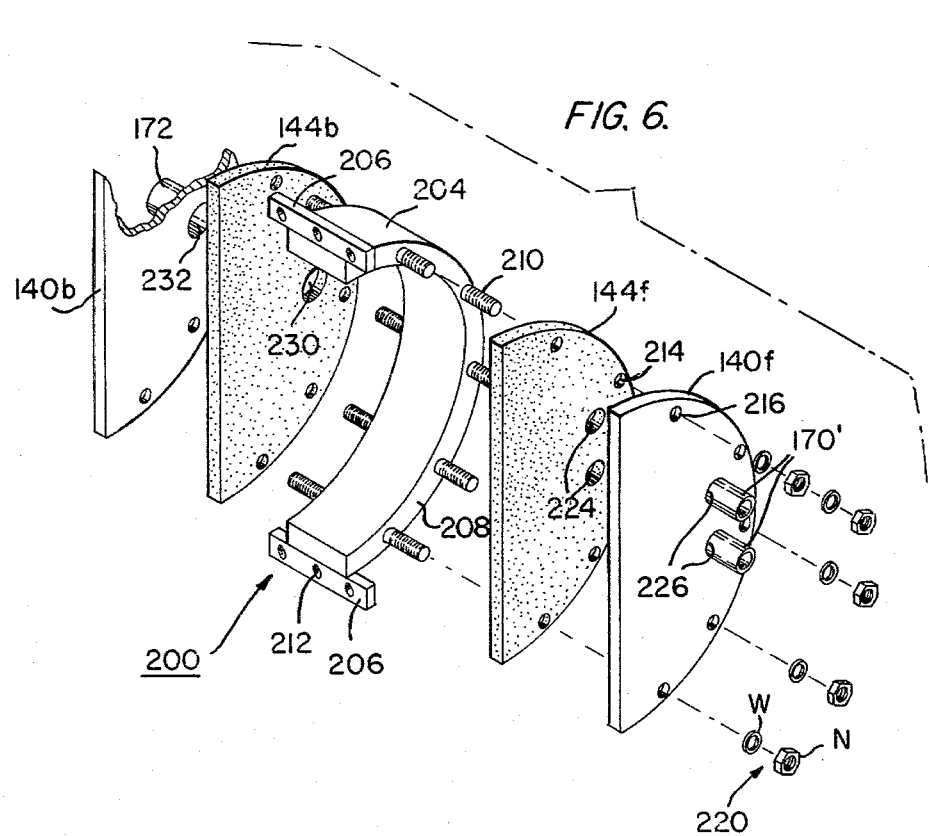

MATERIAL CONVEYOR

BACKGROUND OF THE INVENTION

This application is a continuation-in-part of application Ser. No. 897,338, filed Apr. 18, 1976, now U.S. Pat. No. 4,179,232.

The present invention relates in general to conveying granular material, and more particularly, to conveying metered amounts of granular material.

Many systems employ granular or pulverulent material. Examples of such systems are dry cement handling systems, hopper container unloading systems, and the like.

Some of the systems used to move granular material from one location, such as a hopper or other storage device, to another location are required to deliver such granular material in metered amounts. The metered amounts can take the form of a controlled flow rate or the form of metered charges.

The inventor is aware of several devices which deliver metered amounts of granular material. Examples of such known devices are disclosed in U.S. Pat. Nos. 2,740,672, 2,890,079, 3,009,744 and 3,268,266. While all of the devices disclosed in these patents are somewhat efficient, they all suffer from drawbacks resulting from inefficient and inaccurately delivered material. The size of the charges of material delivered by these devices often varies beyond limits required for great accuracy, and such inaccuracies are not easily corrected, if they are correctable at all. Furthermore, some of the granular material delivered to these devices may be crushed by the device. Such crushed material may cause inaccuracies in the processes using the material delivered by the device.

SUMMARY OF THE INVENTION

The device embodying the teachings of the present invention comprises a hopper body, and granular material enters that body through the top thereof. An induction wheel is mounted within the hopper body to rotate in a vertical plane in a direction opposite to the influx of granular material. The wheel scoops up material from a reservoir formed on the bottom of the hopper by the inflowing material, and carries that material upwardly. The wheel includes a plurality of elongate ladle-shaped chambers which are open at both ends thereof and which are loaded via both of those open ends. The chambers are generally overfilled during the transit thereof through the reservoir, and excess material spills out of the chambers through the open ends back into the reservoir before the chambers reach the twelve o'clock position on the wheel. The speed of wheel rotation, level of the reservoir, size of the chamber openings and the like are adjusted so that nearly all of the excess material is spilled out of the chamber during this phase of operation. Such spilling avoids damage to the material.

The device includes a pair of tandem wipers mounted on the housing near the twelve o'clock position of the wheel to gently remove any remaining excess material located at the chamber ends and protruding thereoutof.

A pair of air retaining pads are each mounted on opposite sides of the wheel and contact the wheel after that wheel has passed the position whereat the chamber of interest is at the twelve o'clock position. The pads seal the chambers.

A pair of longitudinally aligned ports are mounted in the housing and a gas induction conduit and a material transport conduit are connected to those ports to be in longitudinally aligned relationship on the housing, so that the induction wheel is located therebetween. The chambers are sequentially longitudinally aligned with the conduits, and high pressure gas, such as air, or the like, is inducted into the chambers via the gas induction conduit, and exhausted into the transport conduit on the other side of the chamber to force the material out of the chamber into that transport conduit. The material is then transported to a suitable location in that transport conduit.

By being loaded from both ends, the chambers are efficiently loaded, and the spillage therefrom can be controlled to occur at a desired sequential position of the chamber on the wheel, and at desired times in the operation. Thus, the size of the charge contained within each chamber is accurately controlled and spillage therefrom occurs at the most propitious time. The device of the present invention thus delivers precise charges of material and operates in a manner not likely to damage the material so that waste is eliminated, or at least minimized, as compared to prior devices.

The pads of the present invention seal the chambers and thus insure that gas is not wasted through leakage out of the chambers, thereby producing efficient and precise use of gas. Such gas usage further enables precise control of charge size, as leakage in the charge moving gas upstream effects flow rates therein, as well as the amount of material actually removed from the chamber. In the limit, maximum leakage may even cause the gas pulse into the chambers of prior devices to fail to remove any of the charge, thereby rendering these device completely inoperative. The pads of the present invention seal the chambers and thus minimize leakage to maximize the accuracy of the gas pulse delivery and hence the precision with which the charge is removed from a chamber. Precision at the initial point in the delivery process permits the rest of the delivery process to be accurate.

As material in the induction wheel is being carried upwardly, material spilling out of the chambers is gravity assisted and thus the device of the present invention takes advantage of gravity rather than opposing it. The efficient removal of excess material thus not only improves the precision of the present device over that of the prior art, but has maximum life of the elements thereof, such as the pads, due to the removal of abrasive materials prior to contact with the pads.

The device of the present invention is quite amenable to use with a large variety of power systems, thereby increasing the flexibility thereof over prior devices.

An alternative embodiment of the metering device includes a pair of pressurizing conduits located to pressurize a pair of sequential chambers at the same time and thus at least two chambers are pressurized at all times. The alternative embodiment also includes an air pad retaining unit which holds the air pads in position and does not require any adjustments thereto.

OBJECTS OF THE INVENTION

It is therefore a main object of the present invention to convey granular material in an accurately metered manner.

It is another object of the present invention to convey granular material in a manner which prevents excessive waste of such material.

It is a further object of the present invention to convey granular material in a manner which efficiently utilizes the high pressure gas used in the material transport system.

It is still another object of the present invention to convey granular material using a device having elements which are arranged to reduce wear and abrasion thereon.

It is still a further object of the present invention to convey granular material using a device having chambers which are efficiently loaded with a charge of material the size of which is accurately set.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 6 is an exploded perspective of an air pad retaining housing used in the alternative embodiment of the conveying device embodying the teachings of the present invention.

DETAILED DESCRIPTION OF THE INVENTION

Figure 1:
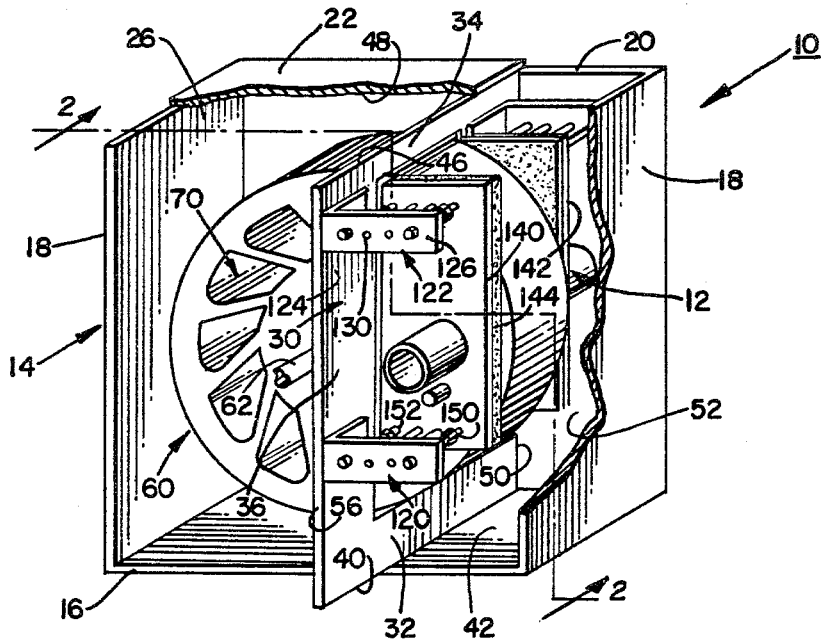
FIG. 1 is a partially cut away perspective of the granular material conveying device embodying the teachings of the present invention.
Figure 2:
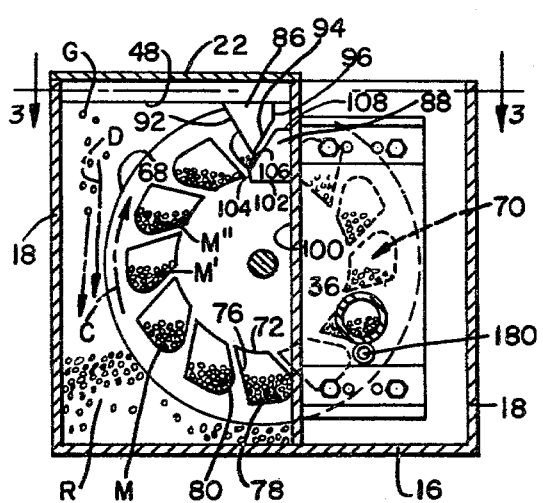
FIG. 2 is a view taken along line 2—2 of FIG. 1.

Shown in FIG. 1 is a metering device 10 which conveys metered amounts of granular material to a material transport line 12. The device 10 includes a housing 14 which includes a bottom 16, upstanding sides 18, a back 19, a front 20, and a top 22. A material entrance 26 is defined in the top 22 near one of the sides 18. As shown in FIG. 2, material, such as pulverulent or granulated material G is discharged from a source (not shown) such as a hopper, or the like, into the housing 14 via the entrance 26. The material G gravitates downwardly in freefall from the entrance as indicated by the arrow D and collects on the bottom of the housing to form a reservoir as indicated in FIG. 2 by the indicator R. The reservoir is located in a lower section of the housing and will be more fully discussed below.

The metering device includes a U-shaped bracket 30 having a base section 32, a top section 34 and a vertically oriented bight section 36. The bracket is mounted along the outer peripheral edge 40 of base 32 on inner surface 42 of the bottom 16 and along the outer peripheral edge 46 of the top 34 on the inner surface 48 of the top 22. The front edges 50 of the legs are each mounted on the inner surface 52 of the housing front 20, and the outer peripheral edge 56 is mounted on inner surface 58 of the housing back. The bracket 30 is thus securely mounted in the housing to retain the vertical on-edge orientation shown therefor in FIG. 1. The bracket 30 is located to be just off center and thereby divide the housing contained volume into two unequal sections.

A vertically revolving induction wheel 60 is mounted on a shaft 62 for rotation therewith. The shaft 62 is horizontally disposed and extends through the housing front and back walls. The shaft 62 is suitably journalled in those walls to be freely rotatable and is connected to a suitable power source (not shown) to be rotated thereby. Clockwise rotation of the wheel 60 is preferred and is indicated in FIG. 2 by arrow C. The clockwise rotation of the wheel 60 is counter to the downward flux of the material G and thus is least disruptive thereof and is least disturbed thereby.

The wheel 60 has a pair of side faces 64 and 66 (see FIG. 3) and a rim 68 connecting those two faces. A multiplicity of circumferentially disposed ladle-shaped chambers 70 are defined in the wheel to extend axially thereof and to be located adjacent, but spaced from, the rim 68. Each chamber has an inner wall 72 which is arcuate and positioned so that the walls 72 of the multiplicity of chambers define a generatrix of a circle which is concentric with the circular rim 68. The chambers each have a top wall 76 which is essentially straight and skewed with respect to a radial direction of the wheel to lie on a nondiametric secant of the wheel 60. The inner and outer walls are connected by a parabolically-shaped wall 78 which has a bulge 80 in the outermost section thereof. The chambers 70 are open-ended and scoop out material G from the reservoir R as the wheel 60 turns.

As an empty chamber is immersed in the reservoir, the material is sufficiently fluent to move into that chamber via both empty ends thereof. The chambers are suitably sized, the rotational velocity and continuity of the rotation of the wheel is selected, and the depth of reservoir R is adjusted via adjustment of the influx timing and rate through housing entrance 26, so that, upon emerging from the reservoir, the chambers will all contain roughly the same charge of material, indicated by the reference indicator M in FIG. 2. As the wheel rotates, some of the material will drop out of the chambers, and the various sizes of the charges are indicated in FIG. 2 as M' and M''.

A tandem pair of wipers 86 and 88 are located on each side of the wheel to flushly engage the wheel sides 64 and 66. As shown in FIG. 2, the wiper 86 is attached to surface 48 of top 22 and has a forward surface 92 which is downwardly depending therefrom and has a rear surface 94 which intersects the forward surface and is upwardly inclined therefrom. A vertical surface 96 connects the rear surface to the surface 48. The wiper forward surface 92 may be slanted outwardly from the wheel and the wiper removes excess material from the chambers, and that removed material falls back into the reservoir.

The wiper 88 is attached to surface 100 of the bracket bight section 36 and extends outwardly therefrom. The wiper 88 has a lower surface 102, a front edge 104 which is essentially vertical, and a forward surface 106 which is upwardly inclined from the front edge. A top surface 108 is essentially horizontal and connects the forward surface to the bight surface 100. The forward surface 106 is positioned to be in spaced parallelism with the lower surface 94 of the wiper 86, and serves to assist in the removal of excess material from the chambers as those chambers move therepast.

A similar pair of wipers is located adjacent wheel side 64, but is not shown for the sake of clarity. The wipers remove excess material so that material is not damaged during operation of the device 10. Without the wipers, some of the material would be destroyed, and hence wasted.

A pair of L-shaped brackets 120 and 122 are mounted on surface 124 of the bracket bight section 36. The brackets 120 and 122 are in spaced parallelism and each has a web section 126 which extends outwardly from the bight section. A plurality of fasteners, such as bolts 130, are connected to the bracket webs to extend horizontally toward the center of the housing. As shown in FIG. 1, there are two pairs of L-brackets with the wheel 60 being located therebetween. A pair of pad backing members 140 and 142 are attached to the L-brackets by the bolts, and each pad backing member has a pad 144 thereon. The pads 144 are vertically oriented, are in spaced parallelism with each other, and each contacts one of the surfaces 64 and 66 of the wheel 60 to occlude the chambers 70. The pads obstruct the chambers in an air-tight manner and a pair of springs 150 and 152 surround the endmost bolts of each L-shaped bracket to bias the pads against the wheel surfaces with a constant and steady pressure which is sufficient to insure air-tightness of the rubbing engagement between the pads and the wheel without inducing undue wear on the pads or unduly inhibiting rotation of the wheel 60. As just-discussed, the wipers remove excess material, and, without such excess material removal, some of the material may become lodged between the wheel and the pads 144 and be crushed. Such material not only is wasted, but may abrade both the wheel and the pads, thereby reducing the life and effectiveness of those elements.

Figure 3:
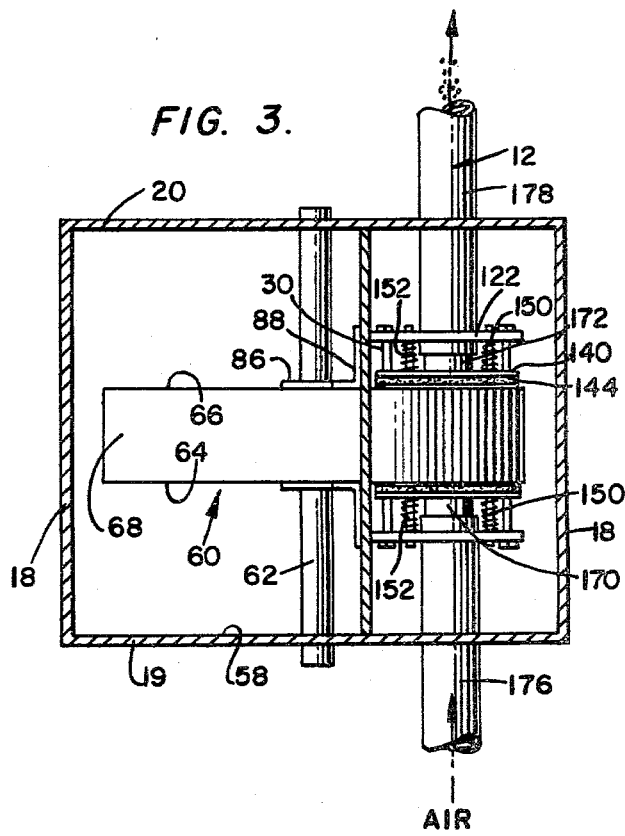
FIG. 3 is a view taken along line 3—3 of FIG. 2.

As best shown in FIG. 3, a pair of axially aligned conduit attaching means 170 and 172, respectively, are attached to the pads and pad backing members to extend horizontally away from the wheel 60. An air inlet conduit 176 is fluidly connected to member 170 and a material transport conduit 178 is fluently attached to member 172 for conveying the material to a suitable location. Air from a suitable source (not shown) is directed to the chambers 70 via conduit 176 in member 170. A vent tube 180 is mounted on the pads and pad backing members immediately behind (in the clockwise direction of wheel rotation) the member 176. As the pads cover the chambers in an air-tight manner, air conducted into the chamber via airline 176 will pressurize that chamber. The air passes through the chamber and into conduit 178 carrying with it the material contained within the chamber. As the chamber contains a specific quantity of material, the amount of material pulsed into conduit 178 from each of the chambers is an accurately metered quantity.

The chamber may not completely vent into outlet line 178 and may thus move beyond the material transfer point in line with the aligned conduits 176 and 178 still under an excess pressure. This excess pressure is relieved via vent valve 180.

The operation of the metering device 10 is evident from the above description and will thus only be briefly presented. The rotation of the wheel 60 can be continuous, sequential, or continuous with a dwell period, as suitable. In any event, the chambers 70 are each filled from both ends thereof to overflowing as they are moved through the reservoir R, and some of the material spills out as the wheel rotates the overfilled chamber upwardly out of the reservoir. By loading the chambers from both sides, complete loading of the chambers is insured. The level of the reservoir is maintained so that the top surface thereof is always located below the axis of rotation of the wheel and at a location selected to insure proper spillage rates from the chambers. By moving upwardly through the reservoir, the ladle-shape of the chambers is fully utilized in a scooping action. Thus, gravity assists in the loading of the chambers.

The wipers 86 and 88 on both sides of the wheel remove excess material, and the quantity of material remaining in each chamber is thus uniform, and hence accurately metered. The chambers are then moved between the pads 140 and 142 and closed in an air-tight manner. Each chamber then is sequentially moved into alignment with the conduits 176 and 178, whereat a blast of air, or other suitable gas, is directed into the interior of the chamber. At this point, a pause in wheel rotation can be effected using appropriate timing, or mechanical means, or the like, to permit the full charge of material to be exhausted into line 178 via member 172 by the gas moving from conduit 176 through chamber 70 and into the line 178.

Continued rotation of the wheel 60 then aligns the material exhausted chamber with vent valve 180, whereat any excess unexhausted gas still contained in the chamber is vented therefrom. Continued rotation of the chamber brings the chamber back into contact with the reservoir R, and the above-described process reoccurs. Any material not exhausted from the chamber simply remains in the chamber and forms part of the next charge in the chamber. However, the sequential operation of the elements can be adjusted to prevent such residue, as the presence thereof changes the volume of the meter charges delivered by the device 10. If these charges must be accurately controlled, the existence of such residue is, of course, undesirable, but as just-discussed, can be prevented by adjusting the elements of the device 10 and the sequence of operation thereof.

The just-described process is repeated as often as desired and at a suitable rate to produce a desired rate of material flow through conduit 178. The conduit 178 can also be connected to a suitable suction means to assist in conveying material through that conduit. The suction will thus work in conjunction with the air pressure produced via conduit 176 to move the material through conduit 178 to the desired location.

The device 10 is amenable to systems involving several different types of power. Thus, the wheel 60 can be rotated using electric motors, internal combustion engines, or the like.

Figure 4:
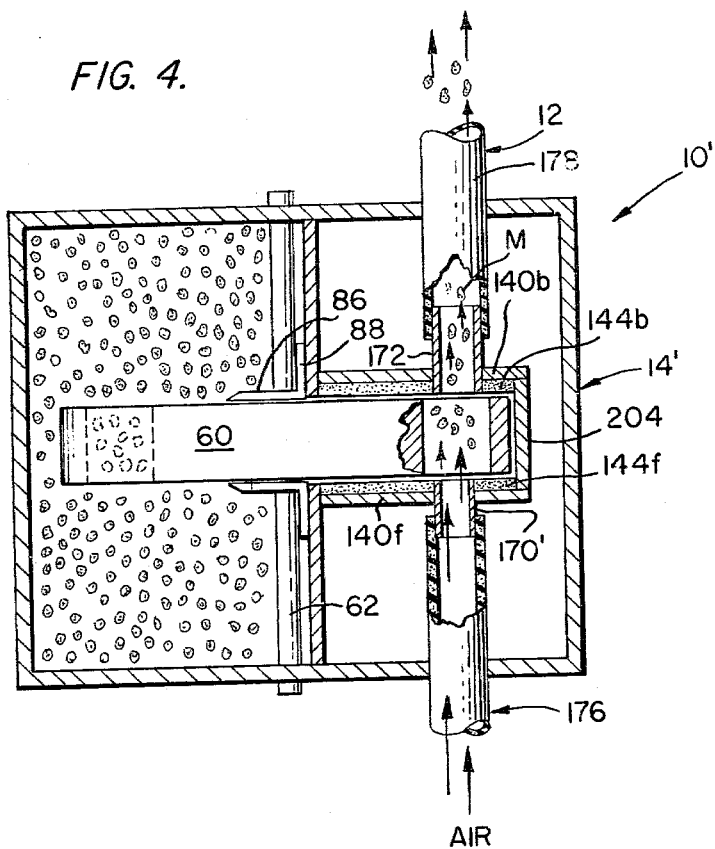
FIG. 4 is a top plan view of an alternative embodiment of the conveying device embodying the teachings of the present invention.
Figure 5:
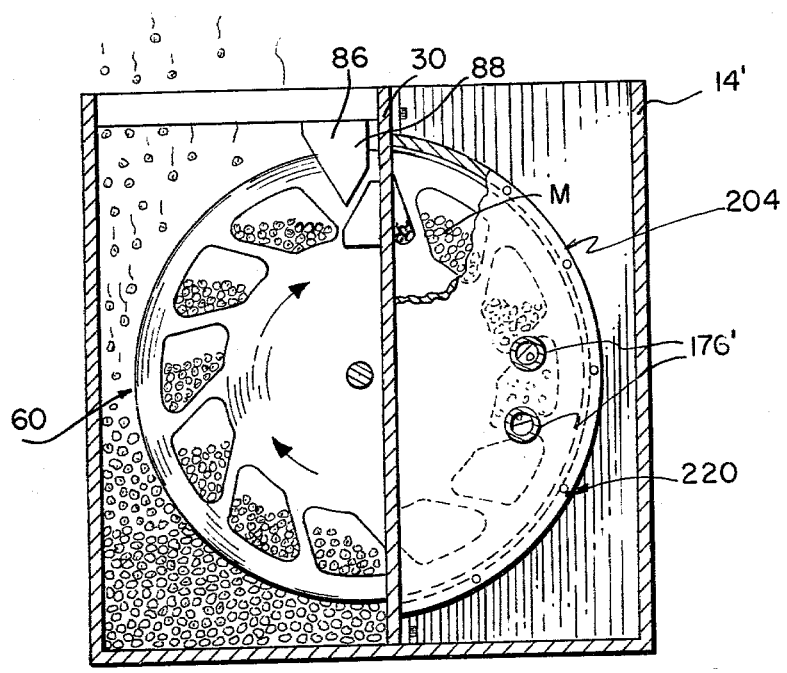
FIG. 5 is an elevation view of the alternative embodiment of the conveying device embodying the teachings of the present invention.

Shown in FIGS. 4, 5 and 6 is an alternative embodiment of the metering device which embodies the teachings of the present invention. The device is denoted by the reference numeral 10' and includes a housing 14' similar to the housing of device 10, but which has some differences, which will become apparent from the following description, to accommodate the elements of the alternative embodiment. The metering device 10' includes a pair of air inlet conduits 176' which are vertically aligned and serve to maintain at least two sequentially located chambers 70 pressurized at all times. Accordingly, the housing 14' differs from the housing 14 to accommodate the two air inlet conduits 176'. By keeping two sequential chambers pressurized, granular material is prevented from being vacuumed back into the wheel 60 as that wheel rotates. Such back-vacuum prevention assures that essentially all of the material is discharged into the airstream.

As best shown in FIGS. 4 and 6, the metering device 10' also includes a pad unit 200. The pad unit 200 holds a pair of semicircular air retaining pads 144f and 144b in a fixed position, and thus no adjustments are necessary. The unit 200 is shown in FIG. 6 to include a pair of semicircular pad backing members 140f and 140b and a semicircular housing segment 204 having a flange 206 on each end of a web section 208. The housing segment 204 surrounds the wheel 60 and thus has an inner diameter slightly larger than the outer diameter of the wheel 60 so that the wheel can rotate freely therewithin. As shown in FIG. 6, the web section, the pads and the backing members are all correspondingly shaped. A plurality of fasteners, such as bolts 210, are mounted on the web section to be oriented axially thereof and to extend outwardly thereof. The flanges 206 each has a plurality of fastener receiving holes 212 defined therein for attaching the housing segment 204 to the bracket 30 by bolts, or the like.

The pads and pad backing members each has a plurality of fastener receiving holes 214 and 216, respectively, defined therein to receive the bolts 210. A fastener locking assembly 220 which includes a nut N and a washer W is associated with each bolt to securely lock the pads and pad backing members to the housing segment.

As shown in FIG. 6, the pad 144f and the backing member 140f associated therewith have aligned holes 224 and 226, respectively, to correspond to the pair of conduits 176'. A pair of conduit attaching members 170' are mounted on the pad backing member 140f to extend axially outward of the wheel 60 and to be fluidly attached to air inlet conduits 176' for conducting air into a pair of sequentially oriented chambers. The conduit attaching members are spaced apart a distance sufficient to maintain pressure on a pair of sequentially oriented chambers simultaneously. As in the first embodiment, only one material transport conduit is included in the metering device 10'. Accordingly, single apertures 230 and 232 are defined in the pad 144b and backing member 140b, respectively, to fluidly connect conduit attaching member 172 to the interior of a chamber for fluidly connecting that chamber to the material transport conduit as in the metering device 10.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A device for conveying granular material comprising:

a housing having a material entrance defined therein;

an induction wheel rotatably mounted on said housing, said wheel having a plurality of elongate open-ended chambers defined therein;

a pair of wipers mounted on said housing adjacent said wheel and located so that said wheel passes between said wipers to gently remove excess material from the ends of said chambers without damaging that removed material, said pair of wipers including wipers spaced from each other to define a material escape path through which said gently removed material passes;

sealing means mounted on said housing to sealingly cover said chamber ends, said sealing means including an arcuate housing surrounding said wheel and secured to said housing, a pair of pad members secured to said housing, a pair of pad backing members secured to said arcuate housing and springs biasing said pads against said wheel in a secure manner, said sealing means being separate from and spaced apart from said wipers to be located so that a chamber on said induction wheel passes between said pair of wipers prior to passing said sealing means, said wipers removing excess material from adjacent the ends of a chamber before such chamber is sealed by said sealing means so that material does not interfere with any seal formed between said sealing means and said chamber ends such that said chambers are securely closed to minimize loss of any gas introduced into said chambers for moving material out of said chambers;

gas introducing means connected to said sealing means to introduce gas from a source into a chamber; and material transport means connected to said sealing means to receive gas and material from said chambers for transporting said material away from said induction wheel.

2. The device defined in claim 1 wherein said induction wheel has a rim and said chambers are ladle-shaped and are mounted in a circle which is concentric with the rim of said induction wheel.

3. The device defined in claim 1 further including a vent mounted on said sealing means for venting excess pressure from said chambers.

4. The device defined in claim 1 wherein said induction wheel is mounted to rotate in a vertical plane in a direction opposite to the direction of movement of material into said housing through said material entrance.

5. The device defined in claim 4 wherein said entrance is located in the top of said housing.

6. The device defined in claim 4 further including a reservoir of material located on the bottom of said housing.

7. The device defined in claim 6 wherein said reservoir has a top surface located below the axis of rotation of said induction wheel.

8. The device defined in claim 1 further including a second pair of wipers each mounted adjacent one of said first pair of wipers.

9. The device defined in claim 1 wherein said gas introducing means includes a pair of conduits.

* * * * *